Jan. 21, 1936.   C. ROBERGE   2,028,412
BUBBLER TIP
Filed March 20, 1935

INVENTOR.
Charles Roberge.
BY
Walter C. Ross
ATTORNEY.

Patented Jan. 21, 1936

2,028,412

UNITED STATES PATENT OFFICE 2,028,412

BUBBLER TIP

Charles Roberge, Williamsburg, Mass.

Application March 20, 1935, Serial No. 11,980

2 Claims. (Cl. 299—15)

This invention relates to improvements in drinking-water apparatus and is directed more particularly to improvements in bubbler tips and the like such as are used for discharging small streams of water for drinking purposes.

The principal objects of the invention are directed to the provision of a bubbler tip device which is adapted to be attached to a water-supply and which is novelly constructed and arranged to deliver a smooth uniform stream of water which may be controlled so as to be continuous or intermittent as may be desired.

According to special features of this invention, the bubbler tip is made and arranged for the utmost cleanliness in its use and is adapted for attaching to a water-supply pipe with which may be associated means to control the flow of water.

Various other novel features and advantages of the invention will be hereinafter more fully referred to in connection with the accompanying description of the preferred form of the invention, reference being had to the accompanying drawing wherein.

Figure 1:
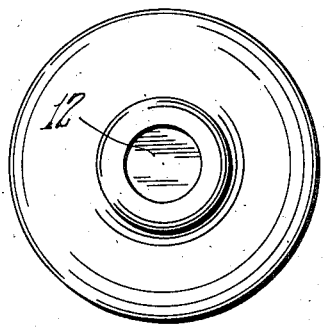
Fig. 1 is a plan view of a bubbler tip device embodying the novel features of the invention.

Referring now to the drawing more in detail, the invention will be fully described.

The bubbler tip B of the invention includes a body portion 2 which has a boss 4 on its lower side that is tapped out at 6 for connecting the device to a water supply pipe or the like. The body portion 2 is a hollow and its walls are arranged to provide a central enlarged chamber part 8.

The wall or walls curve inwardly and upwardly from the enlarged part as at 10 to an outlet orifice 12. This outlet is preferably of less diameter than the enlarged chamber 3 and it is desirable that it be of some length as shown.

Figure 2:
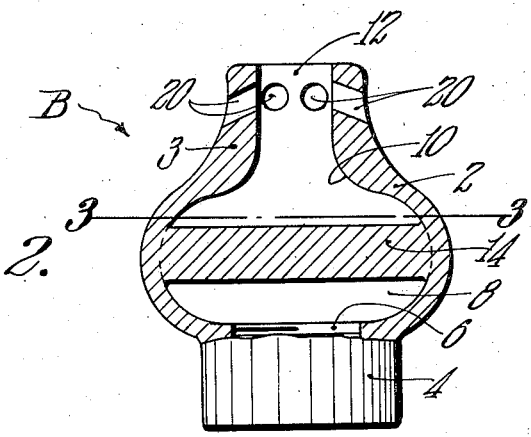
Fig. 2 is a sectional elevational view through the bubbler tip shown in Fig. 1.
Figure 3:
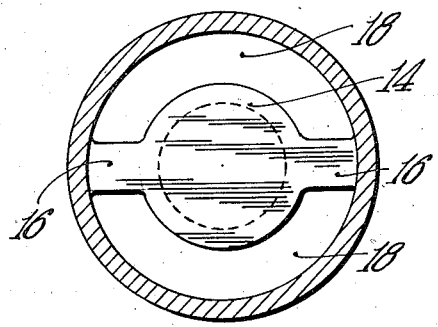
Fig. 3 is a sectional plan view on the line 3—3 of Fig. 2 to explain certain features of the invention.

A baffle member 14 is provided within the body and this extends transversely across the enlarged chamber of the bubbler tip as shown in Fig. 2. This baffle 14 may be in the form of a disc as shown in Fig. 3 having its edges spaced from the walls forming the chamber to form passageways 18.

Connectors such as 16 at opposite sides of the baffle extend from the disc 14 to the wall. In this way, there are provided the passageways 18 between the baffle 14 and wall of the bubbler tip while at the same time the baffle is held securely in place.

Openings 20 are provided in a neck portion 3 of the bubbler tip which extend through the wall from the discharge orifice 12. These are preferably inclined downwardly as shown.

As water flows to the bubbler tip it passes into the enlarged chamber thereof and around the baffle and outwardly. That is, as water enters the bubbler tip, it flows outwardly against the wall and through passageways 18 rather than directly upwardly. Because of the curvature inwardly of the walls the water is caused to swirl outwardly around the baffle and then inwardly and upwardly through the discharge orifice so as to provide a smooth uniform stream of water.

Any water entering the openings 20 is directed downwardly and not directly outwardly which protects the person standing alongside the bubbler tip from being sprayed. If by any chance should one place a finger over the orifice, any water flowing into the bubbler tip will be directed downwardly as is desirable in devices of this kind to prevent water being sprayed outwardly.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A bubbler tip comprising in combination, a body having a lower hub provided with an inlet opening therethrough and a side wall having inner sides which extend outwardly and upwardly from said hub and then inwardly and upwardly forming a relatively elongated outlet at the upper side of the bubbler and an enlarged chamber between said outlet and inlet of a diameter larger than said outlet, an imperforate disc-like baffle in said chamber below said outlet and above said inlet which is of less diameter than the chamber and having its edges spaced from said wall to provide a substantially ring-like water passageway between the edges of said baffle and said wall, and a relatively narrow connecting member extending between the edge of said baffle and wall fixedly holding the said baffle in the chamber at a distance above and below said inlet and outlet, all adapted and arranged whereby water entering the inlet is caused to strike the underside of said baffle and be deflected outwardly thereby and flow through said passageway in the form of a substantially tubular stream and then upwardly through said outlet in the form of a smooth solid stream.

2. A bubbler tip comprising in combination, a body having a lower hub provided with an inlet opening therethrough and a side wall having inner sides which extend outwardly and upwardly from said hub and then inwardly and upwardly forming a relatively elongated outlet at the upper side of the bubbler and an enlarged chamber between said outlet and inlet of a diameter larger than said outlet, an imperforate disc-like baffle in said chamber below said outlet and above said inlet which is of less diameter than the chamber and having its edges spaced from said wall to provide a substantially ring-like water passageway between the edges of said baffle and said wall, and a relatively narrow connecting member extending between the edge of said baffle and wall fixedly holding the said baffle in the chamber at a distance above and below said inlet and outlet, all adapted and arranged whereby water entering the inlet is caused to strike the underside of said baffle and be deflected outwardly thereby and flow through said passageway in the form of a substantially tubular stream and then upwardly through said outlet in the form of a smooth solid stream, the said wall adjacent said outlet being provided with openings therethrough disposed radially relative to the axis of said outlet.

CHARLES ROBERGE.